United States Patent
Skeel et al.

[19]

[11] Patent Number: 6,129,056
[45] Date of Patent: Oct. 10, 2000

[54] COOLING SYSTEM FOR WORK VEHICLE

[75] Inventors: James C. Skeel; Dale M. Winkelman, both of Fargo, N. Dak.

[73] Assignee: Case Corporation, Racine, Wis.

[21] Appl. No.: 09/379,438

[22] Filed: Aug. 23, 1999

[51] Int. Cl.⁷ .................................................. F01P 7/10
[52] U.S. Cl. .............................. 123/41.49; 123/41.55; 180/68.1; 165/41
[58] Field of Search ........................... 123/41.49, 41.55; 180/68.1, 68.4; 165/41

[56] References Cited

U.S. PATENT DOCUMENTS

| | | | |
|---|---|---|---|
| 3,752,132 | 8/1973 | Bentz et al. ...................... | 123/119 CD |
| 3,788,418 | 1/1974 | Clancy et al. ..................... | 180/68.1 |
| 3,866,580 | 2/1975 | Whitehurst et al. ................ | 123/41.7 |
| 3,868,992 | 3/1975 | Getz et al. ....................... | 165/51 |
| 3,882,839 | 5/1975 | Ganoung ........................... | 123/148 R |
| 3,921,603 | 11/1975 | Bentz et al. ...................... | 180/68.1 |
| 3,996,999 | 12/1976 | Termoont et al. ................... | 180/68.1 |
| 4,032,365 | 6/1977 | Bricmont .......................... | 148/12 R |
| 4,052,965 | 10/1977 | Morris ............................. | 123/41.05 |
| 4,086,976 | 5/1978 | Holm et al. ....................... | 180/54 A |
| 4,287,961 | 9/1981 | Steiger ............................ | 180/68.1 |
| 4,339,014 | 7/1982 | Berth et al. ...................... | 180/68.1 |
| 4,454,926 | 6/1984 | Akins .............................. | 180/68.1 |
| 4,696,361 | 9/1987 | Clark et al. ...................... | 180/68.4 |
| 5,180,003 | 1/1993 | Kouzel et al. ..................... | 165/121 |
| 5,234,051 | 8/1993 | Weizenburger et al. ............... | 165/41 |
| 5,453,573 | 9/1995 | Callas ............................. | 123/41.73 |
| 5,492,167 | 2/1996 | Glesmann .......................... | 165/41 |
| 5,590,624 | 1/1997 | Emond et al. ...................... | 123/41.49 |
| 5,612,768 | 3/1997 | Roschinksi ........................ | 123/41.49 |
| 5,669,338 | 9/1997 | Pribble et al. .................... | 123/41.29 |
| 5,692,467 | 12/1997 | Sahm et al. ....................... | 123/198 E |
| 5,709,175 | 1/1998 | Carroll ............................ | 123/41.49 |
| 5,785,139 | 7/1998 | Freedy et al. ..................... | 180/68.1 |

*Primary Examiner*—Noah P. Kamen
*Attorney, Agent, or Firm*—Foley & Lardner

[57] ABSTRACT

A cooling system for a work vehicle (e.g., a wheel loader) having reduced air restriction noise includes a cooling system frame defining an enclosure therein. A cooler (e.g., an engine cooler) and a fan are coupled to the cooling system frame, the fan imparting a velocity on a flow of cooling air flowing through the cooler. An air deflection member is coupled to the cooling system frame and extends into the enclosure to shape the flow of cooling air as it travels between the cooler and the fan. The air deflection member defines a fluid reservoir (e.g., a hydraulic reservoir) for holding a fluid (e.g., a hydraulic fluid).

23 Claims, 5 Drawing Sheets

COOLING SYSTEM FOR WORK VEHICLE

FIELD OF THE INVENTION

The present invention relates generally to cooling systems for work vehicles. More specifically, the present invention relates to cooling systems for work vehicles that draw cooling air through one or more coolers.

BACKGROUND OF THE INVENTION

Modern work vehicles, such as, tractors and wheel loaders, include a plurality of coolers to cool various fluids and gases. For example, one wheel loader requires a cooling system having a total of six coolers: an engine cooler (radiator) for cooling engine coolant; a transmission cooler for cooling transmission lubricating oil; a hydraulic cooler for cooling hydraulic fluid in a hydraulic fluid system; a charge air cooler for cooling intake air that is heated when it is compressed by a turbocharger; a cooling portion of an AC condenser for condensing freon gas used in an air conditioning system; and a fuel cooler for cooling fuel that is returned to a fuel tank from an injector pump. Each of these coolers operates by having air drawn through them to cool their respective fluid or gas.

One challenge in the design of work vehicles is the arrangement of these coolers to maintain adequate cooling efficiency. In one prior system, a plurality of coolers are spaced horizontally from one another, in series, in the direction of cooling air flow. Thus, ambient air enters the first cooler, then the second cooler, then the third cooler, and so forth. One drawback of this system is that only the first cooler receives relatively cool, ambient air, while each successive cooler receives air warmed by all of the preceding coolers. This arrangement reduces the cooling efficiency of the system.

Another challenge in the design of work vehicles is the arrangement of these coolers to reduce noise levels. Fan noise is a function of air restriction, among other factors, and can be very uncomfortable to the operator and to surrounding workers. In one prior system, a primary fan pushes air through a heat exchanger while a secondary fan located on the opposite side of the heat exchanger pulls the air through the heat exchanger. One drawback of this system is that the system includes two fans, both contributing to the noise levels of the cooling system. Another drawback of this system is that the primary pusher fan blows air directly into the heat exchanger. The primary pusher fan stirs up dirt particles and projects them at a high velocity into the heat exchanger, requiring more robust, and more costly, coolers.

Yet another challenge in the design of work vehicles is the arrangement of these coolers to receive clean ambient air. In some systems, air is drawn up from below the vehicle and/or through the engine compartment. This air is likely to contain relatively high dirt and particulate levels, which can result in clogging the cores of the coolers.

What is needed is a cooling system for a work vehicle that adequately addresses each of the above design challenges, wherein each cooler receives relatively cool and clean ambient air, the noise level is relatively low for both the operator and bystanders, and the coolers are not subjected to impingement by dirt particles driven by a pusher fan. The cooling system would also advantageously allow modular construction so that the cooling system can be pre-assembled at a remote location and then placed into the work vehicle during final assembly. The cooling system would also be located on the work vehicle in a position that allows optimum weight distribution and lower noise levels.

SUMMARY OF THE INVENTION

These and other needs are achieved by the present invention which, according to one embodiment, is a cooling system for a work vehicle including a cooling system frame defining an enclosure therein. A cooler and a fan are coupled to the cooling system frame, the fan imparting a velocity on a flow of cooling air flowing through the cooler. An air deflection member is coupled to the cooling system frame and extends into the enclosure to shape the flow of cooling air as it travels between the cooler and the fan. The air deflection member defines a fluid reservoir configured to hold a fluid.

According to another exemplary embodiment of the present invention, a cooling system for a work vehicle is provided including a cooling system frame defining an enclosure therein. A cooler and a fan are coupled to the cooling system frame. An air deflection means extends into the enclosure for shaping the flow of cooling air as it travels between the cooler and the fan, and forms a fluid reservoir to hold a fluid.

According to yet another exemplary embodiment of the present invention, a work vehicle comprises an engine compartment, a cooling system frame defining an enclosure therein, and a cooler, a fan and an air deflection member coupled to the cooling system frame. The fan imparts a velocity on a flow of cooling air flowing through the cooler and exhausts the flow of cooling air into the engine compartment. The air deflection member extends into the enclosure to shape the flow of cooling air as it travels between the cooler and the fan. The air deflection member defines a reservoir to hold a fluid.

BRIEF DESCRIPTION OF THE DRAWINGS

The invention will become more fully understood from the following detailed description, taken in conjunction with the accompanying drawings, wherein like reference numerals refer to like parts, and in which.

DETAILED DESCRIPTION OF THE PREFERRED EMBODIMENTS

Figure 1:
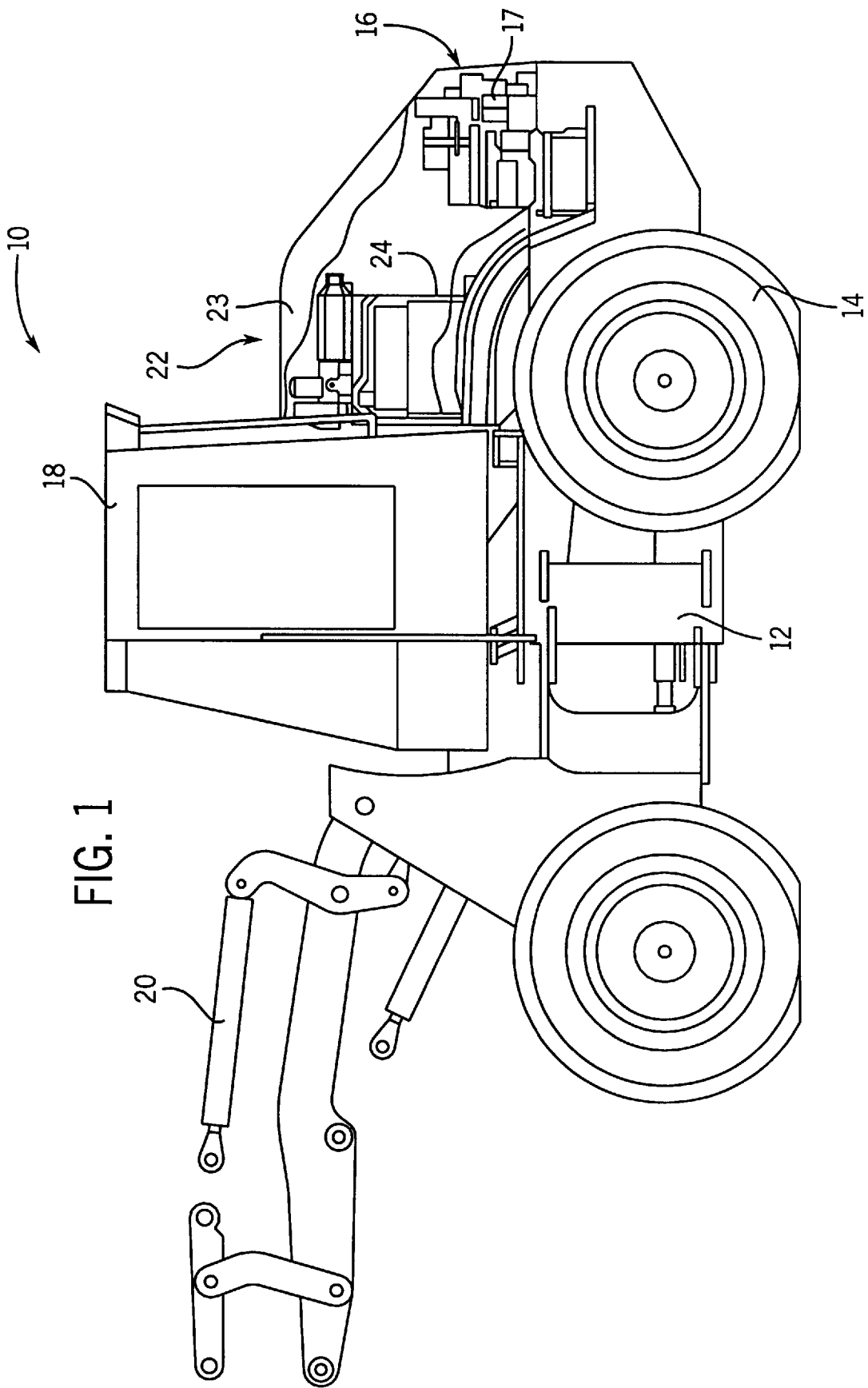
FIG. 1 is a side view of a work vehicle having a cooling system according to an exemplary embodiment of the present invention.

Referring first to FIG. 1, a side view of a work vehicle 10 according to one embodiment of the present invention is shown. Work vehicle 10 is, for example, a D-Series Wheel Loader manufactured by Case Corporation, Racine, Wis., but may alternatively be another construction, agricultural or other work vehicle. Work vehicle 10 includes a body 12 supported by a plurality of wheels 14 or tracks. Wheels 14 are driven by an engine 16. An operator controls vehicle 10 from a cab 18 and operates one or more implements 20, such as a bucket loader. Vehicle 10 further includes a cooling system 22, as will be described hereinafter in greater detail. Cooling system 22 includes a fan 24 and is advantageously mounted between cab 18 and engine 16 within a cooling system compartment 23.

Engine 16 is mounted rearward of the axles of wheels 14 within an engine compartment 17. This mounting arrangement of engine 16 improves the stability of work vehicle 10 with less rear-mounted counterweight, thus providing increased stability without increasing the weight of vehicle 10. This mounting arrangement further contributes to lower noise levels for the operator since the engine is moved away from the operator, thereby relieving the operator of some of the engine noise. Also, the mounting of the cooling system fan (described hereinafter) deeper within the vehicle than the fan-mounting location provided by prior cooling systems reduces the amount of cooling system noise to which bystanders are exposed since the cooling system fan is placed further from the bystanders.

Figure 2:
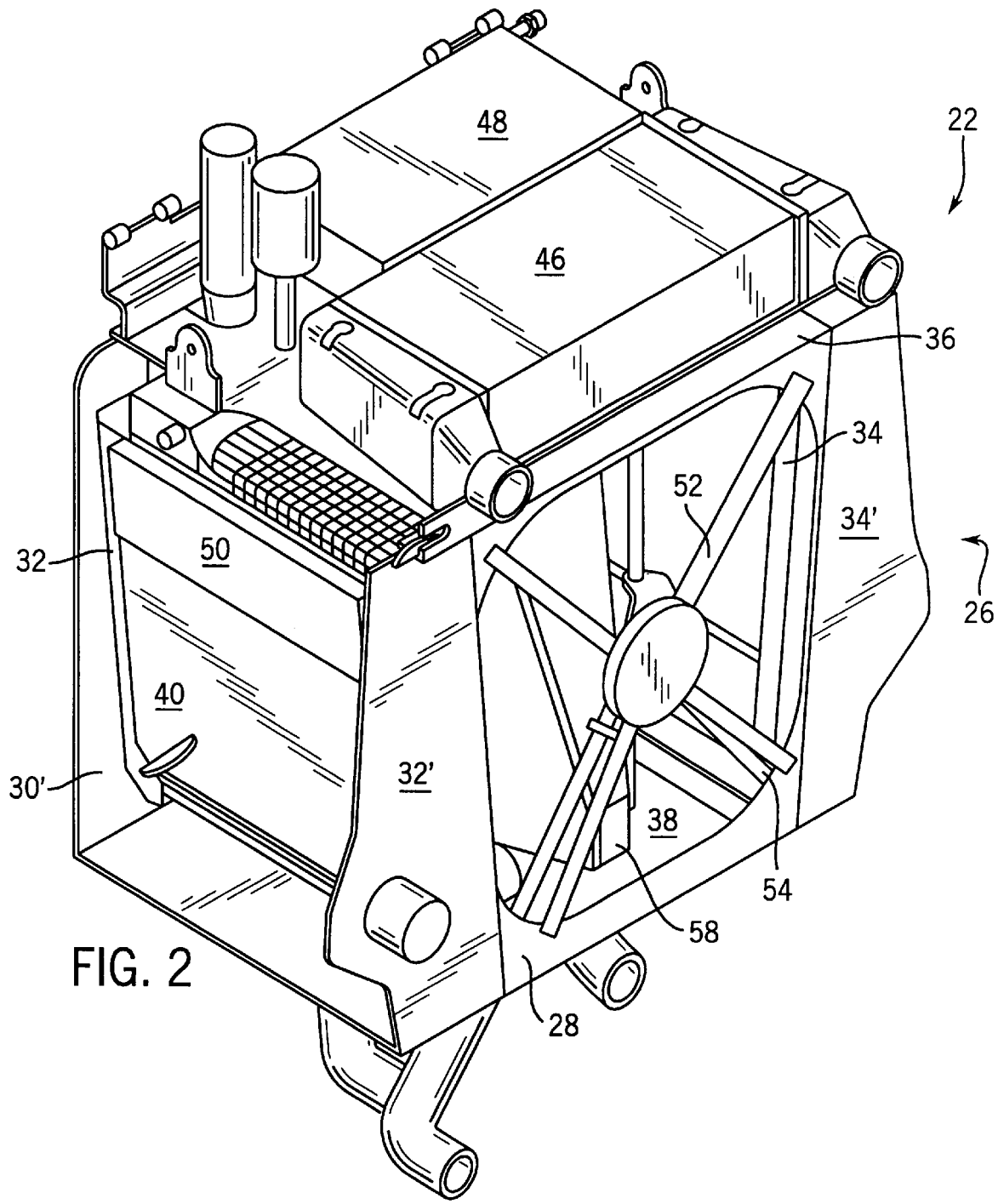
FIG. 2 is a left rear isometric view of the cooling system of FIG. 1.
Figure 3:
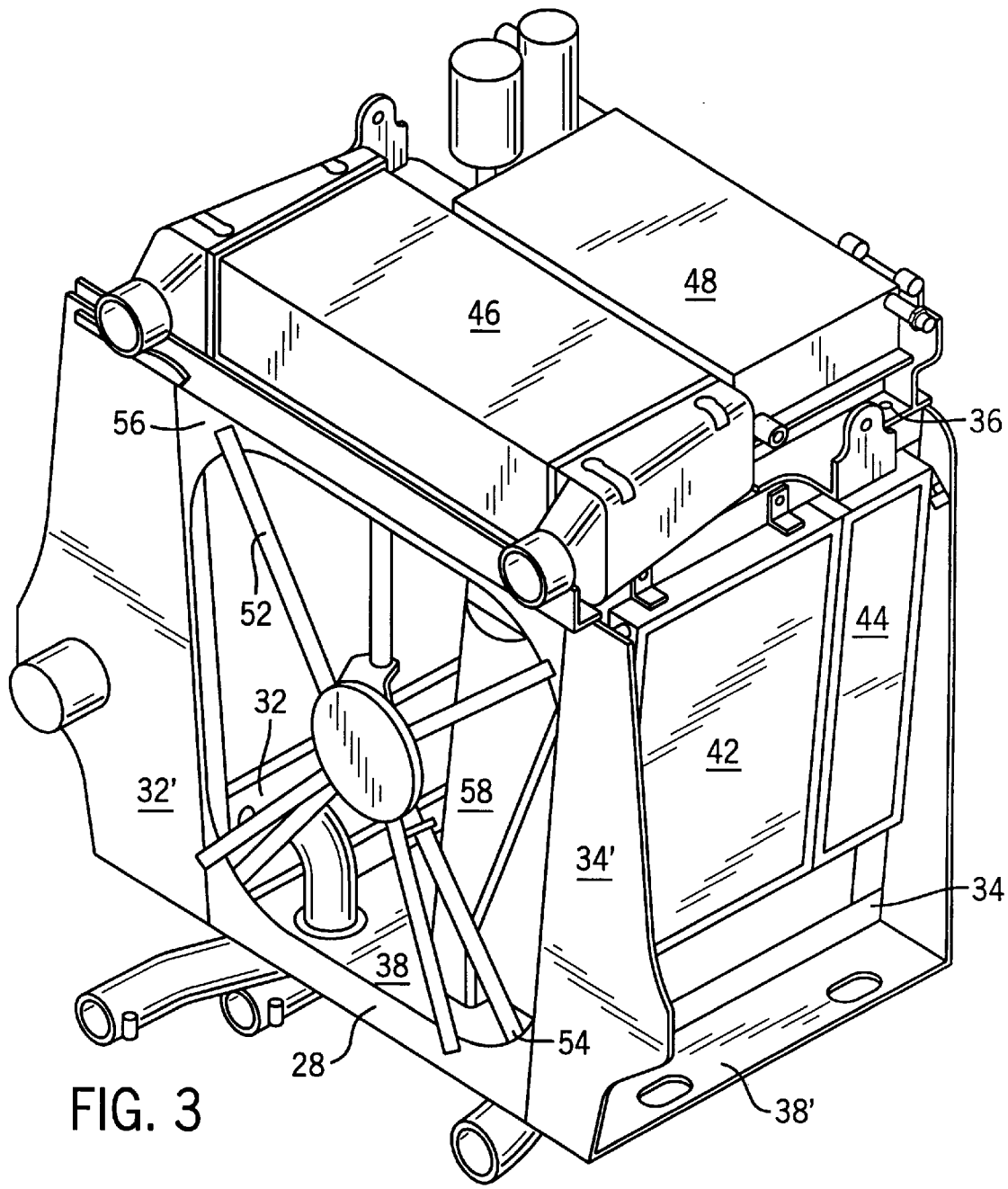
FIG. 3 is a right rear isometric view of the cooling system of FIG. 1.
Figure 4:
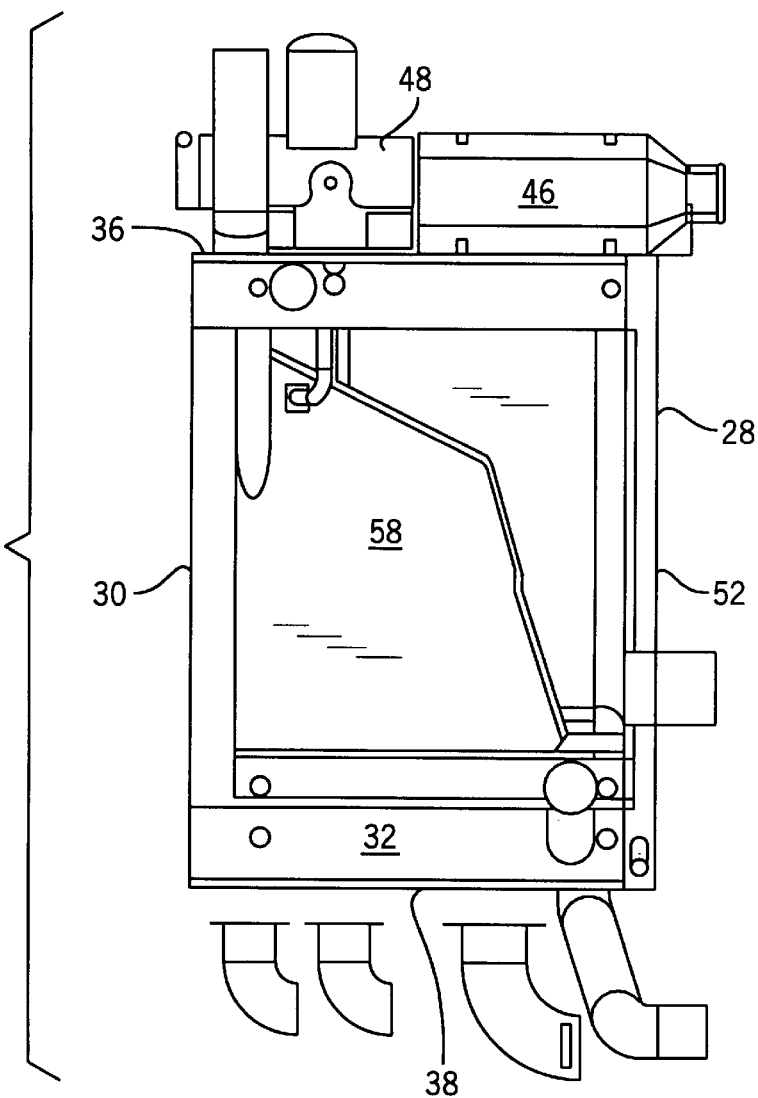
FIG. 4 is a left side cutaway view of the cooling system of FIG. 1.

Referring now to FIGS. 2, 3 and 4, cooling system 22 is shown in greater detail. Cooling system 22 includes a cooling system frame 26 having a trapezoidal box shape with rear and front walls 28, 30, respectively, slanted left and right sidewalls 32, 34, respectively, rectangular top 36 and a rectangular bottom 38 slightly smaller than rectangular top 36. Alternatively, cooling system frame 26 may have a cube shape or other 3-dimensional polytopic shape defining an enclosure therein (e.g., a pyramid). Flanges 32' and 34' extend from walls 32 and 34, respectively, and are adapted for substantial mating alignment with cooling system compartment 23.

A plurality of coolers are provided on the various faces of cooling system frame 26. These coolers include an engine cooler (i.e., radiator) 40, a transmission cooler 42, a hydraulic cooler 44, a charge air cooler 46, an AC condenser 48 and a fuel cooler 50, each of which operates as a heat exchanger for cooling a particular fluid or gas as described hereinabove. Engine cooler 40 and fuel cooler 50 are coupled to the left sidewall 32 in partial overlying relationship, fuel cooler 50 being on the outside of engine cooler 40. Transmission cooler 42 and hydraulic cooler 44 are bolted together and coupled to the right sidewall 34 in side-by-side relationship. Charge air cooler 46 and AC condenser 48 are coupled to top 36 in side-by-side relationship. Each cooler includes conduits, pumps and the like necessary to deliver a fluid or gas to be cooled from a corresponding system, to the cooler and back to the corresponding system.

A fan 52 is coupled to a drive mechanism 54 (e.g., a hydraulic drive mechanism) which drives fan 52. Fan 52 is an axial flow fan, but may alternatively include a radial fan, centrifugal fan or other type of fan. Drive mechanism 54 may alternatively be a drive shaft, electric motor, or other source of rotational power. Drive mechanism 54 is coupled to rear wall 28. Fan 52 is preferably configured to rotate within a circular shroud (not shown) mounted to the external side of rear wall 28 and having a diameter slightly larger than the diameter of the fan blades to help focus the air stream and increase the efficiency of fan 52.

Cooling system 22 further includes an air deflection member 58 coupled to front wall 30 and to bottom 38 which extends into cooling system frame 26 and, more specifically, into the enclosure defined by the walls of cooling system frame 26. In this embodiment, air deflection member 58 also serves as a fluid reservoir configured to hold a fluid, for example, a hydraulic oil reservoir configured to hold a supply of hydraulic oil. The reservoir formed by air deflection member 58 could alternatively hold other fluids.

The structure of cooling system 22 is modular in design and, thus, can be pre-assembled at a remote location and then coupled to work vehicle 10 during a final assembly step of work vehicle 10. In the embodiment wherein air deflection member 58 also serves as a hydraulic oil reservoir, space is conserved on work vehicle 10 by eliminating or reducing the need for a separate reservoir. The arrangement of coolers 40–50 is merely exemplary, and coolers 40–50 may be rearranged in alternative embodiments of the present invention. For example, not all work vehicles 10 will include hydraulic oil cooler 44 or AC condenser 48. Cooling system 22 may optionally include temperature sensors (not shown), for example, a temperature sensor may be coupled to engine cooler 40 to sense the temperature of engine coolant in engine cooler 40 and report this temperature to an operator in cab 18. One or more temperature sensors may also be coupled at one or more locations to cooling system 22 and to a fan drive mechanism control circuit to control the speed of the fan based upon the sensed temperature.

During operation, fan 52 is driven by drive mechanism 54 to blow air at a substantially constant speed from cooling system frame 26 toward engine compartment 17, thereby creating a negative pressure in cooling system frame 26 and drawing ambient air in through all of coolers 40–50. Cooling system compartment 23 defines apertures near side walls 32, 34 and top 36 to allow for the inflow of ambient air from the top and sides of vehicle 10, where the air is relatively clean. The flow of ambient air through each of coolers 40–50 is properly balanced, since the pressure drop across each of coolers 40–50 is substantially the same. Air deflection member 58 is designed according to CFD (Computational Fluid Dynamics) studies to shape the airflow to the most efficient path with minimal restrictions, while ensuring that the pressure drop across each of coolers 40–50 is substantially the same. The heated air passes through engine compartment 17 and exits the rear and bottom of engine compartment 17.

Figure 5:
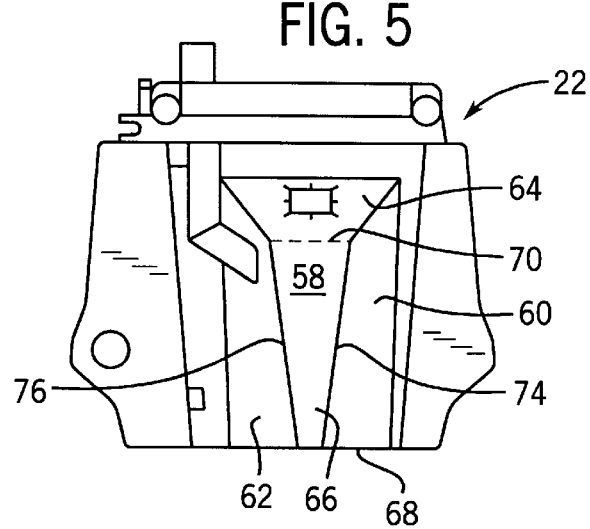
FIG. 5 is a rear cutaway view showing the air deflection member of the cooling system of FIG. 1.
Figure 6:
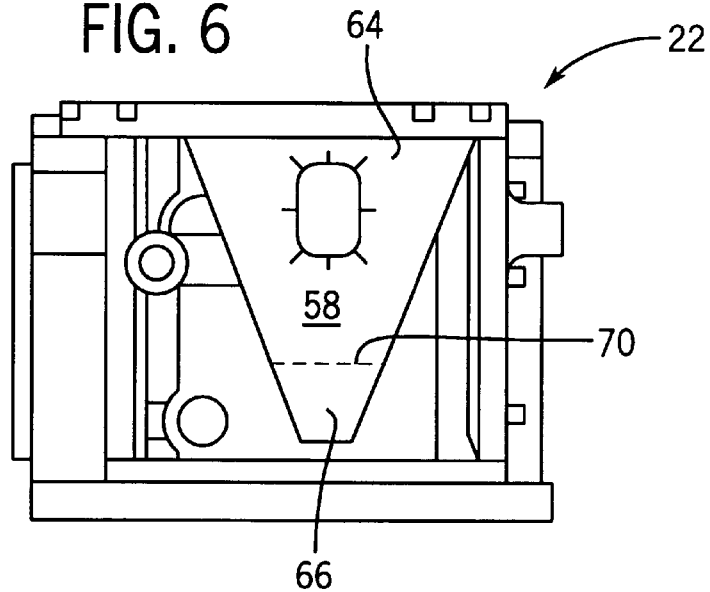
FIG. 6 is a top cutaway view showing the air deflection member of FIG. 5.
Figure 7:
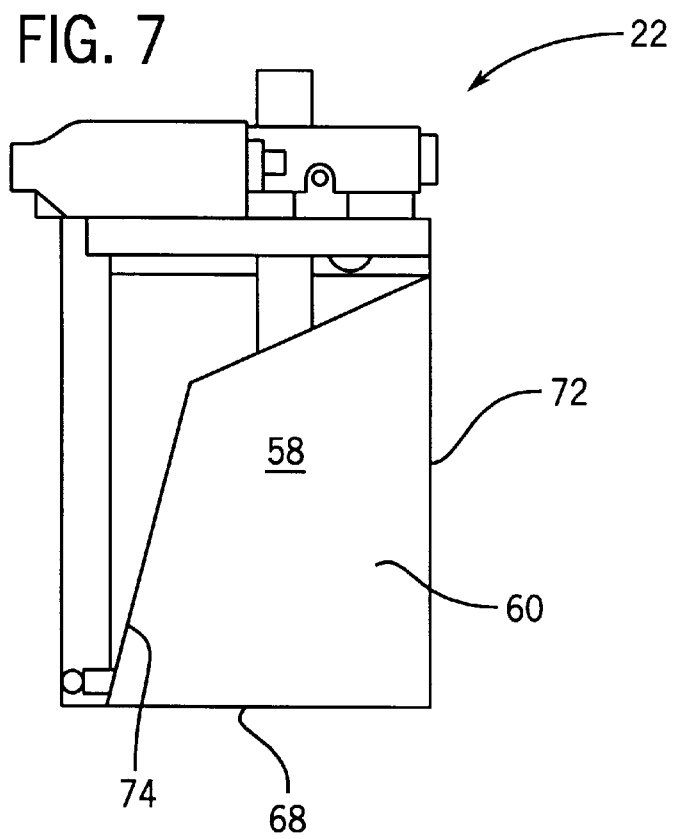
FIG. 7 is a right side cutaway view showing the air deflection member of FIG. 5.

Air deflection member 58 is now described in greater detail with reference to FIGS. 5, 6 and 7. FIG. 5 is a rear cutaway view of cooling system 22. Air deflection member 58 includes a right side panel 60, a left side panel 62, a top panel 64, a rear panel 66, a base panel 68 and a front panel 72. A rear edge 70 of top panel 64 angles toward base panel 68 and tapers in width. Rear panel 66 meets top panel 64 at edge 70 and continues the taper to base panel 68. Edge 70 of rear panel 66 also angles toward front panel 72. Side panels 60, 62 angle toward each other at edges 74, 76, the edges that panels 60, 62 share with rear panel 66. In this embodiment, bottom 38 of cooling system frame 26 is base panel 68. Thus, air deflection member 58 includes four surfaces exposed to the cooling air in the enclosure of cooling system frame 26. In an embodiment wherein air deflection member 58 defines a fluid reservoir, the surfaces of deflection member 58 may be composed of a good heat-conducting material (e.g., metal, such as, steel) so that the cooling air cools the fluid in air deflection member 58.

The structure of air deflection member 58 shapes the air flowing through the enclosure defined by cooling system frame 26 to reduce turbulence and air resistance within the enclosure. As mentioned, CFD analysis was performed showing both air pressure and air velocity to search for "dead spots" within the enclosure and to design a suitable air deflection member. Air deflection member 58 smooths out the 90 degree turn in airflow required for ambient air to travel first through coolers 40–50 and then through fan 52. This smoothing of the airflow not only reduces noise due to air restriction, but also serves to reduce the power required by fan 52 to direct the air in the desired flow path. In a typical prior art system, about 15 horsepower is required to move 12,000 cubic feet of air. The present invention requires only about 6 horsepower to move 12,000 cubic feet of air. The reduced cooling system power requirements translates into reduced load on engine 16, resulting in obvious savings in fuel economy and required engine output.

In prior designs, air was sometimes drawn into a cooling system from the bottom of the cooling system or from the engine compartment, such that the cooling air flow was relatively dirty and/or warm. In the present invention, however, relatively clean and cool ambient air is drawn into the enclosure of cooling system frame 26 from side walls 32, 34 and top 36. The advantageous result of the present invention is that the ambient air contains less particles to clog coolers 40–50. Also, since the air is not drawn across any heat sources before it reaches coolers 40–50, the air reaching the coolers is ambient on all exterior cooler faces. Furthermore, since this embodiment of the present invention utilizes a suction force to draw air through coolers 40–50, the coolers can be constructed of less costly materials since they do not have to withstand the dirt particles that are driven against them with a pusher fan design which blows air into the coolers.

Cooling system frame 26 may be configured to be cleanable, i.e., to allow a worker to remove dust and debris from inside the frame. One possible configuration is to hingedly attach hydraulic cooler 44 and transmission cooler 42 (which in the embodiment of FIGS. 1–4 are bolted together and coupled to right sidewall 34 of cooling system frame 26) to cooling system frame 26 such that they swing toward cab 18, allowing entry into frame 26. Another configuration is to similarly hingedly attach AC condenser 48 (which is coupled to top 36 of cooling system frame 26) to cooling system frame 26 such that it swings open toward cab 18. Other hinged configurations allowing access to the enclosure defined by cooling system frame 26 are contemplated. Cooling system frame 26 may also include drainage holes (not shown) in bottom 38 to allow an operator to inject water through coolers 40–50 to clean coolers 40–50 and air deflection member 58.

With the configuration of coolers 40–50, fan 52 and air deflection member 58 of the present invention, the fan speed can be greatly reduced as compared to prior art cooling systems. Accordingly, fan 52 is less likely to draw debris into cooling system frame 26, perhaps eliminating the need for any of the above-stated cleaning configurations.

While the embodiments illustrated in the FIGURES and described above are presently preferred, it should be understood that these embodiments are offered by way of example only. For example, the air deflection member may take a variety of different shapes, depending on the results of the CFD analysis, which are a function of many factors, including which coolers are coupled to the cooling system frame, the shape of the cooling system frame, etc. Also, while the exemplary embodiment disclosed in the FIGURES has many of the advantageous features of the present invention, alternative embodiments may still solve problems in the prior art by including one or only a few of the features disclosed herein. Accordingly, the invention is not limited to a particular embodiment, but extends to various modifications that nevertheless fall within the scope of the appended claims.

What is claimed is:

1. A cooling system for a work vehicle, comprising:
  a cooling system frame defining an enclosure therein and having first and second walls;
  a cooler coupled to the cooling system frame;
  a fan coupled to the first wall of the cooling system frame to impart a velocity on a flow of cooling air flowing through the cooler; and
  an air deflection member coupled to the second wall of the cooling system frame and extending into the enclosure to shape the flow of cooling air as it travels between the cooler and the fan, wherein the air deflection member defines a at least a portion of a fluid reservoir configured to hold a fluid.

2. The cooling system of claim 1, wherein the fluid includes hydraulic oil.

3. The cooling system of claim 1, wherein the fan is configured to draw the cooling air from outside the cooling system frame through the cooler and into the cooling system frame.

4. The cooling system of claim 1, wherein the cooler is an engine radiator.

5. The cooling system of claim 1, wherein the cooling system frame is substantially box-shaped.

6. The cooling system of claim 5, wherein the cooling system frame includes a trapezoidal-shaped wall, the fan being disposed in the trapezoidal-shaped wall.

7. The cooling system of claim 1, wherein the cooling system frame has a bottom wall and at least one side wall, the cooler coupled to the side wall, the fan drawing the cooling air through the side wall and into the enclosure.

8. The cooling system of claim 1, wherein the cooling system frame has a top wall and at least one side wall, the cooler coupled to the side wall, the fan drawing the cooling air through the top wall and into the enclosure.

9. The cooling system of claim 1, wherein the cooling system frame has a first wall, a second wall and a third wall, the fan being coupled to the first wall, the cooler being coupled to the second wall, and the air deflection member being coupled to the third wall, the fan drawing the cooling air through the cooler, across the air deflection member and out of the cooling system frame via the first wall.

10. The cooling system of claim 1, wherein the cooler is hingedly coupled to the cooling system frame to allow operator access to the enclosure.

11. The cooling system of claim 1, further comprising a second cooler coupled to the cooling system frame, wherein the fan also imparts a velocity on a second flow of air flowing through the second cooler, and the air deflection member also shapes the second flow of cooling air as it travels between the second cooler and the fan.

12. The cooling system of claim 11, wherein the cooling system frame is substantially box shaped, and both of the coolers are mounted on a single wall of the cooling system frame.

13. The cooling system of claim 11, wherein the cooling system frame is substantially box shaped, and each of the coolers is mounted on a different wall of the cooling system frame.

14. The cooling system of claim 11, wherein the air deflection member is shaped to provide a substantially equal pressure drop across both of the coolers.

15. A cooling system for a work vehicle, comprising;
  a cooling system frame defining an enclosure therein;
  a cooler coupled to the cooling system frame;
  a fan coupled to the cooling system frame; and
  air deflection means extending into the enclosure for redirecting the flow of cooling air as it travels between the cooler and the fan, and for forming at least a portion of a fluid reservoir to hold a fluid.

16. The cooling system of claim 15, wherein the fluid includes hydraulic oil.

17. The cooling system of claim 15, wherein the cooling system frame has a first wall, a second wall and a third wall, the fan being coupled to the first wall, the cooler being coupled to the second wall, and the air deflection means being coupled to the third wall, the fan drawing the cooling air through the cooler, across the air deflection means and out of the cooling system frame via the first wall.

18. The cooling system of claim 15, further comprising a second cooler coupled to the cooling system frame, wherein the fan also imparts a velocity on a second flow of air flowing through the second cooler, the air deflection means for shaping the second flow of cooling air as it travels between the second cooler and the fan.

19. The cooling system of claim 18, the air deflection means for providing a substantially equal pressure drop across both of the coolers.

20. A work vehicle, comprising:
   an engine compartment;
   a cooling system frame defining an enclosure therein;
   a cooler coupled to the cooling system frame;
   a fan coupled to the cooling system frame to impart a velocity on a flow of cooling air flowing through the cooler and to exhaust the flow of cooling air into the engine compartment; and
   an air deflection member coupled to the cooling system frame and extending into the enclosure to redirect the flow of cooling air as it travels between the cooler and the fan, wherein the air deflection member defines at least a portion of a fluid reservoir to hold a fluid.

21. The vehicle of claim 20, wherein the fan draws cooling air from outside the cooling system frame and through the cooler, and wherein the fan blows the air into the engine compartment.

22. The vehicle of claim 20, further comprising a cab, the cooling system frame being located between the cab and the engine.

23. The vehicle of claim 20, wherein the cooling system frame is substantially box-shaped.

* * * * *